US012625644B2

(12) United States Patent
Liu et al.

(10) Patent No.: US 12,625,644 B2
(45) Date of Patent: May 12, 2026

(54) METHOD AND APPARATUS FOR TRANSFERRING DATA, HETEROGENEOUS PLATFORM, DEVICE, AND MEDIUM

(71) Applicant: IEIT SYSTEMS CO., LTD., Jinan (CN)

(72) Inventors: Wei Liu, Jinan (CN); Yaming Xu, Jinan (CN); Wei Guo, Jinan (CN); Ziwei Deng, Jinan (CN); Can Zhang, Jinan (CN)

(73) Assignee: IEIT SYSTEMS CO., LTD., Jinan (CN)

( * ) Notice: Subject to any disclaimer, the term of this patent is extended or adjusted under 35 U.S.C. 154(b) by 0 days.

(21) Appl. No.: 19/139,829

(22) PCT Filed: Feb. 28, 2024

(86) PCT No.: PCT/CN2024/078897
§ 371 (c)(1),
(2) Date: Jun. 16, 2025

(87) PCT Pub. No.: WO2024/260012
PCT Pub. Date: Dec. 26, 2024

(65) Prior Publication Data
US 2026/0119073 A1 Apr. 30, 2026

(30) Foreign Application Priority Data
Jun. 19, 2023 (CN) .......................... 202310721744.1

(51) Int. Cl.
*G06F 3/06* (2006.01)

(52) U.S. Cl.
CPC ............ *G06F 3/0655* (2013.01); *G06F 3/061* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 9,092,426 | B1 | 7/2015 | Bathija et al. |
| 10,296,258 | B1 | 5/2019 | Richardson |
| 2016/0154820 | A1 | 6/2016 | Singh et al. |
| 2018/0314433 | A1 | 11/2018 | Guo et al. |
| 2020/0344329 | A1 | 10/2020 | Cannata et al. |
| 2021/0303522 | A1 | 9/2021 | Periyagaram et al. |

FOREIGN PATENT DOCUMENTS

| | | |
|---|---|---|
| CN | 101304373 A | 11/2008 |
| CN | 102680886 A | 9/2012 |
| CN | 105867843 A | 8/2016 |
| CN | 106357814 A | 1/2017 |

(Continued)

*Primary Examiner* — Brian R Peugh
(74) *Attorney, Agent, or Firm* — IPro, PLLC

(57) ABSTRACT

A method for transferring data includes: storing to-be-transferred data to a self-mounted memory, uploading data information of the to-be-transferred data to a system on chip, so that the system on chip packages the data information through a network file system protocol to obtain a network file system protocol packet, obtaining the network file system protocol packet returned by the system on chip, and adding to-be-transferred data to the network file system protocol packet to obtain a target data packet; and sending the target data packet to a corresponding storage server.

20 Claims, 8 Drawing Sheets

Obtaining data information of to-be-transferred data uploaded by a programmable logic device — S21

Packaging the data information through a network file system protocol to obtain a network file system protocol packet — S22

Returning the network file system protocol packet to the programmable logic device, so that the programmable logic device adds the to-be-transferred data to the network file system protocol packet to obtain a target data packet, and sends the target data packet to a corresponding storage server — S23

(56) References Cited

FOREIGN PATENT DOCUMENTS

| | | | |
|---|---|---|---|
| CN | 108028833 | A | 5/2018 |
| CN | 109040207 | A | 12/2018 |
| CN | 111049857 | A | 4/2020 |
| CN | 111225020 | A | 6/2020 |
| CN | 112653730 | A | 4/2021 |
| CN | 113810349 | A | 12/2021 |
| CN | 114089920 | A | 2/2022 |
| CN | 114201317 | A | 3/2022 |
| CN | 115103036 | A | 9/2022 |
| CN | 115374078 | A | 11/2022 |
| CN | 116166198 | A | 5/2023 |
| CN | 116450058 | A | 7/2023 |
| WO | 2021202175 | A1 | 10/2021 |
| WO | 2022105884 | A1 | 5/2022 |

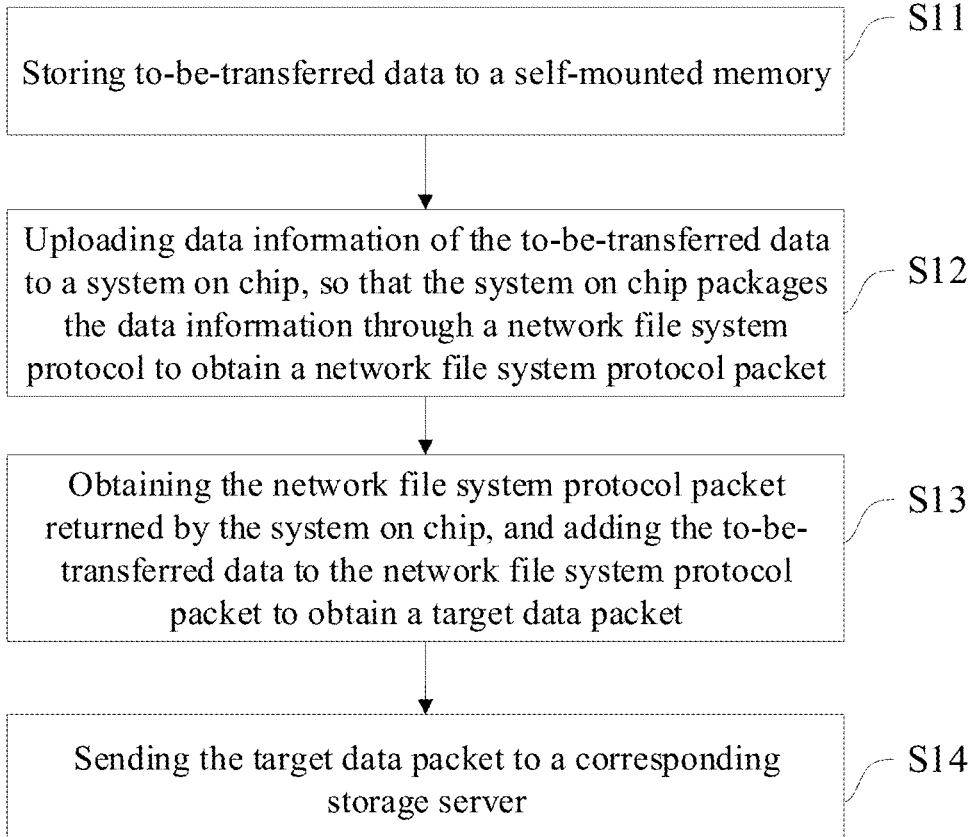

Storing to-be-transferred data to a self-mounted memory — S11

Uploading data information of the to-be-transferred data to a system on chip, so that the system on chip packages the data information through a network file system protocol to obtain a network file system protocol packet — S12

Obtaining the network file system protocol packet returned by the system on chip, and adding the to-be-transferred data to the network file system protocol packet to obtain a target data packet — S13

Sending the target data packet to a corresponding storage server — S14

FIG. 2

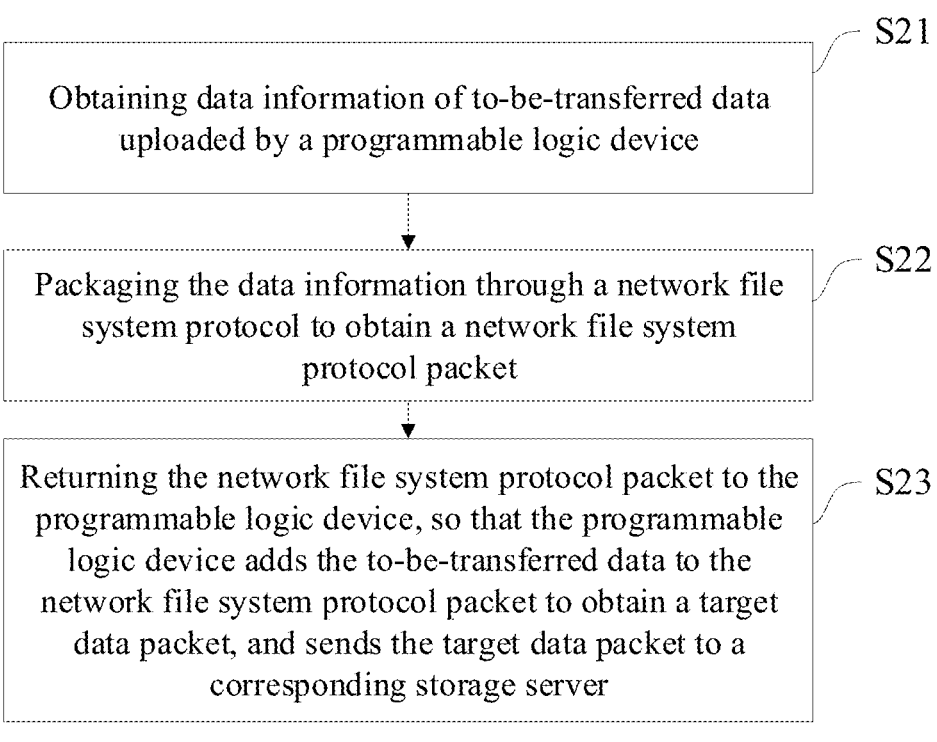

Obtaining data information of to-be-transferred data uploaded by a programmable logic device ⌐ S21

Packaging the data information through a network file system protocol to obtain a network file system protocol packet ⌐ S22

Returning the network file system protocol packet to the programmable logic device, so that the programmable logic device adds the to-be-transferred data to the network file system protocol packet to obtain a target data packet, and sends the target data packet to a corresponding storage server ⌐ S23

FIG. 7

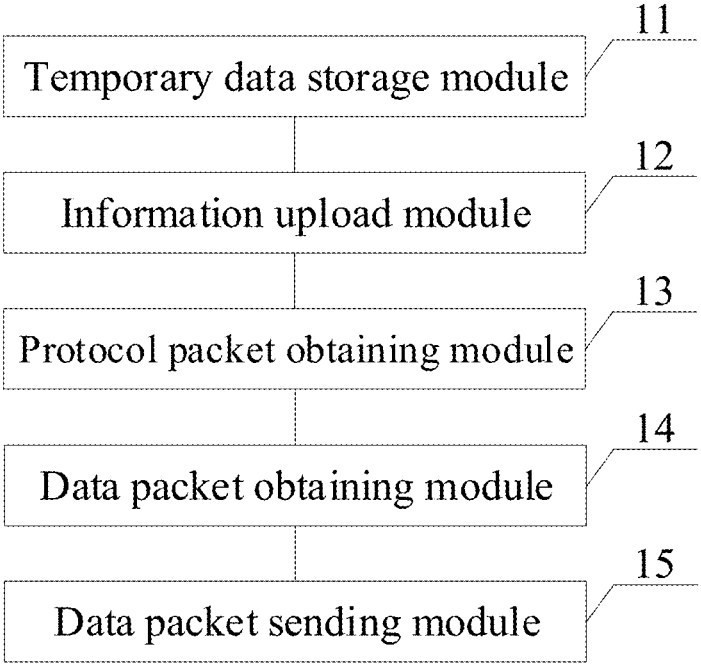

Temporary data storage module 11

Information upload module 12

Protocol packet obtaining module 13

Data packet obtaining module 14

Data packet sending module 15

FIG. 8

METHOD AND APPARATUS FOR TRANSFERRING DATA, HETEROGENEOUS PLATFORM, DEVICE, AND MEDIUM

CROSS-REFERENCE TO RELATED APPLICATION

This disclosure claims the priority of the Chinese Patent application filed on Jun. 19, 2023 before the CNIPA, China National Intellectual Property Administration with the application number of 202310721744.1, and the title of "METHOD AND APPARATUS FOR TRANSFERRING DATA, HETEROGENEOUS PLATFORM, DEVICE, AND MEDIUM", which is incorporated herein in its entirety by reference.

FIELD

The present disclosure relates to the technical field of storage and, more particularly, to a method and apparatus for transferring data, a heterogeneous platform, a device, and a medium.

BACKGROUND

In industrial and measurement scenarios, large-scale raw data usually need to be stored in a distributed server. These raw data usually have private protocols, while the distributed storage server usually employs a Network File System (NFS) protocol. As a result, devices that generate the raw data cannot directly store the data into the distributed storage server.

At present, the usual practice is to transfer the data through a transfer device. The transfer device includes a Field Programmable Gate Array (FPGA) device, a transfer server, and a network card, wherein an application program of the transfer server needs to read data to the server, and then the data are written into a mounted directory through file programming, accompanied by mass data replication, system protocol stack calling, and other processing. These processes often require a lot of time and Central Processing Unit (CPU) resources.

SUMMARY

In view of this, the objective of the present disclosure is to provide a method and apparatus for transferring data, a heterogeneous platform, a device, and a medium, which may improve the efficiency of data transfer and reduce the consumption of CPU resources and hardware costs. Specific solutions are as follows:

In a first aspect, the present disclosure discloses a method for transferring data, applied to a programmable logic device, including:

storing to-be-transferred data to a self-mounted memory;

uploading data information of the to-be-transferred data to a system on chip, so that the system on chip packages the data information through a network file system protocol to obtain a network file system protocol packet;

obtaining the network file system protocol packet returned by the system on chip, and adding the to-be-transferred data to the network file system protocol packet to obtain a target data packet; and sending the target data packet to a corresponding storage server.

In some embodiments, adding the to-be-transferred data to the network file system protocol packet to obtain a target data packet includes:

replacing the data information in the network file system protocol packet with the to-be-transferred data to obtain the target data packet.

In some embodiments, uploading data information of the to-be-transferred data to a system on chip includes:

detecting a data volume of the to-be-transferred data in the memory; and in response to that the data volume reaches a preset threshold, uploading the data information of the to-be-transferred data to the system on chip.

In some embodiments, uploading data information of the to-be-transferred data to a system on chip includes:

uploading a storage address and a data length of the to-be-transferred data in the memory to the system on chip, so that the system on chip packages the data information based on the storage address and the data length through the network file system protocol to obtain the network file system protocol packet.

In some embodiments, an address used by the system on chip when packaging is an address in a pre-requested internal memory, and the data information is filled in from that address.

In some embodiments, the address length of the pre-requested internal memory is consistent with that of the memory.

In some embodiments, the address used by the system on chip when packaging is an address corresponding to the storage address.

In some embodiments, the system on chip packages the data information in a user mode through the network file system protocol.

In some embodiments, the system on chip packages the data information in a user mode over a plurality of threads for a plurality of storage servers in parallel through the network file system protocol.

In some embodiments, storing to-be-transferred data to a self-mounted memory includes:

parsing raw data based on a target protocol corresponding to the raw data to obtain the to-be-transferred data; and storing the to-be-transferred data to the self-mounted memory.

In some embodiments, parsing raw data based on a target protocol corresponding to the raw data to obtain the to-be-transferred data includes:

recognizing the target protocol corresponding to the raw data;

filtering a preset protocol processing logic corresponding to the target protocol from a plurality of preset protocol processing logics; and parsing the raw data based on the filtered preset protocol processing logic to obtain the to-be-transferred data.

In some embodiments, uploading data information of the to-be-transferred data to a system on chip includes:

packaging the data information of the to-be-transferred data through a user datagram protocol to obtain a data information packet; and uploading the data information packet to the system on chip.

In some embodiments, sending the target data packet to a corresponding storage server includes:

sending the target data packet to the corresponding storage server through an optical port.

In a second aspect, the present disclosure discloses a method for transferring data, applied to a system on chip, including:

obtaining data information of to-be-transferred data uploaded by a programmable logic device, wherein the to-be-transferred data is stored to a memory mounted on the programmable logic device;

packaging the data information through a network file system protocol to obtain a network file system protocol packet; and returning the network file system protocol packet to the programmable logic device, so that the programmable logic device adds the to-be-transferred data to the network file system protocol packet to obtain a target data packet, and sends the target data packet to a corresponding storage server.

In some embodiments, further including:

requesting an internal memory, wherein the address length of the internal memory is consistent with that of the memory.

In some embodiments, packaging the data information through a network file system protocol to obtain a network file system protocol packet includes:

packaging the data information based on an address in the internal memory through the network file system protocol to obtain the network file system protocol packet.

In some embodiments, packaging the data information through a network file system protocol to obtain a network file system protocol packet includes:

packaging the data information in a user mode through the network file system protocol to obtain the network file system protocol packet.

In a third aspect, the present disclosure discloses an apparatus for transferring data, applied to a programmable logic device, including:

a temporary data storage module, configured to store to-be-transferred data to a self-mounted memory;

an information upload module, configured to upload data information of the to-be-transferred data to a system on chip, so that the system on chip packages the data information through a network file system protocol to obtain a network file system protocol packet;

a protocol packet obtaining module, configured to obtain the network file system protocol packet returned by the system on chip;

a data packet obtaining module, configured to add the to-be-transferred data to the network file system protocol packet to obtain a target data packet; and a data packet sending module, configured to send the target data packet to a corresponding storage server.

In some embodiments, the data packet obtaining module, specifically configured to replace the data information in the network file system protocol packet with the to-be-transferred data to obtain the target data packet.

In some embodiments, the information upload module, specifically includes:

a data volume detection sub-module, configured to detect a data volume of the to-be-transferred data in the memory; and a data information upload sub-module, configured to upload the data information of the to-be-transferred data to the system on chip in response to that the data volume detection sub-module detects that the data volume reaches a preset threshold.

In some embodiments, the information upload module, specifically configured to upload a storage address and a data length of the to-be-transferred data in the memory to the system on chip, so that the system on chip packages the data information based on the storage address and the data length through the network file system protocol to obtain the network file system protocol packet.

In some embodiments, the temporary data storage module specifically includes:

a data parsing sub-module, configured to parse raw data based on a target protocol corresponding to the raw data to obtain the to-be-transferred data; and a data storage sub-module, configured to store the to-be-transferred data to the self-mounted memory.

In some embodiments, the data parsing sub-module specifically includes:

a protocol recognition unit, configured to recognize the target protocol corresponding to the raw data;

a processing logic filter unit, configured to filter a preset protocol processing logic corresponding to the target protocol from a plurality of preset protocol processing logics; and a data parsing unit, configured to parse the raw data based on the filtered preset protocol processing logic to obtain the to-be-transferred data.

In some embodiments, the information upload module specifically includes:

a data information packaging sub-module, configured to package the data information of the to-be-transferred data through a user datagram protocol to obtain a data information packet; and a data information packet upload sub-module, configured to upload the data information packet to the system on chip.

In some embodiments, the data packet sending module, specifically configured to send the target data packet to the corresponding storage server through an optical port.

In a fourth aspect, the present disclosure discloses an apparatus for transferring data, applied to a system on chip, including:

a data information obtaining module, configured to obtain data information of to-be-transferred data uploaded by a programmable logic device, wherein the to-be-transferred data is stored to a memory mounted on the programmable logic device;

a data information packaging module, configured to package the data information through a network file system protocol to obtain a network file system protocol packet; and a protocol packet return module, configured to return the network file system protocol packet to the programmable logic device, so that the programmable logic device adds the to-be-transferred data to the network file system protocol packet to obtain a target data packet, and sends the target data packet to a corresponding storage server.

In some embodiments, the apparatus is further configured to request an internal memory, wherein the address length of the internal memory is consistent with that of the memory.

Correspondingly, the data information packaging module, specifically configured to: package the data information based on an address in the internal memory through the network file system protocol to obtain the network file system protocol packet.

In some embodiments, the data information packaging module, configured to package the data information in a user mode through the network file system protocol to obtain the network file system protocol packet.

In some embodiments, the data information packaging module, specifically configured to package the corresponding data information in the user mode over a plurality of threads for a plurality of storage servers in parallel through the network file system protocol.

In a fifth aspect, a heterogeneous platform, including a programmable logic device and a system on chip, wherein the programmable logic device is configured to perform the method for transferring data according to the first aspect, and the system on chip is configured to perform the method for transferring data according to the second aspect.

In sixth aspect, the present aspect discloses an electronic device, including a memory and a processor, wherein the memory is configured to store a computer program; and the processor is configured to execute the computer program to implement the method for transferring data.

In seventh aspect, the present disclosure discloses a non-transitory computer-readable storage medium for storing a computer program that, when executed by a processor, implements the method for transferring data.

In the present disclosure, the to-be-transferred data is stored to the self-mounted memory; then the data information of the to-be-transferred data is uploaded to the system on chip, so that the system on chip packages the data information through the network file system protocol to obtain the network file system protocol packet; subsequently, the network file system protocol packet returned by the system on chip is obtained, and the to-be-transferred data is added to the network file system protocol packet to obtain the target data packet; and finally the target data packet is sent to the corresponding storage server. That is, in the present disclosure, the to-be-transferred data is temporarily stored in the self-mounted memory, the data information of the to-be-transferred data instead of the data is uploaded to the system on chip, the system on chip packages the data information through the network file system protocol and returns the network file system protocol packet, and then the programmable logic device adds the to-be-transferred data to the network file system protocol packet and sends it to the storage server.

The present disclosure has the beneficial effects of avoiding batch copying operations of data in a CPU, improving data transfer efficiency, reducing CPU resource consumption and hardware costs.

BRIEF DESCRIPTION OF THE DRAWINGS

In order to describe technical solutions of the embodiments of the present disclosure more clearly, the accompanying drawings used in the illustration of the embodiments will be briefly introduced. Apparently, the accompanying drawings in the following explanation illustrate merely some embodiments of the present disclosure, and those skilled in the art may obtain other accompanying drawings based on these accompanying drawings without paying any creative effort.

FIG. 2 is a flowchart of a method for transferring data according to an embodiment of the present disclosure;

FIG. 7 is a flowchart of another method for transferring data according to an embodiment of the present disclosure;

FIG. 8 is a schematic diagram of an apparatus for transferring data according to an embodiment of the present disclosure.

DETAILED DESCRIPTION

A clear and thorough description for technical solutions in the embodiments of the present disclosure will be given below in conjunction with the accompanying drawings in the embodiments of the present disclosure. Apparently, the described embodiments are a part of embodiments of the present disclosure, not all the embodiments. All other embodiments obtained, based on the embodiments in the present disclosure, by those skilled in the art without paying creative effort fall within the protection scope of the present disclosure.

In industrial and measurement scenarios, large-scale raw data usually need to be stored in a distributed server. These raw data usually have private protocols, while the distributed storage server usually employs an NFS protocol. As a result, devices that generate the raw data cannot directly store the data into the distributed storage server. The NFS mainly allows different host systems to share files or directories through a local area network. Distributed storage: It is a data storage technology that stores data in each corner of an enterprise in a dispersed manner over a network by means of disk space in each machine, wherein dispersed storage resources constitute a virtual storage device.

Figure 1:
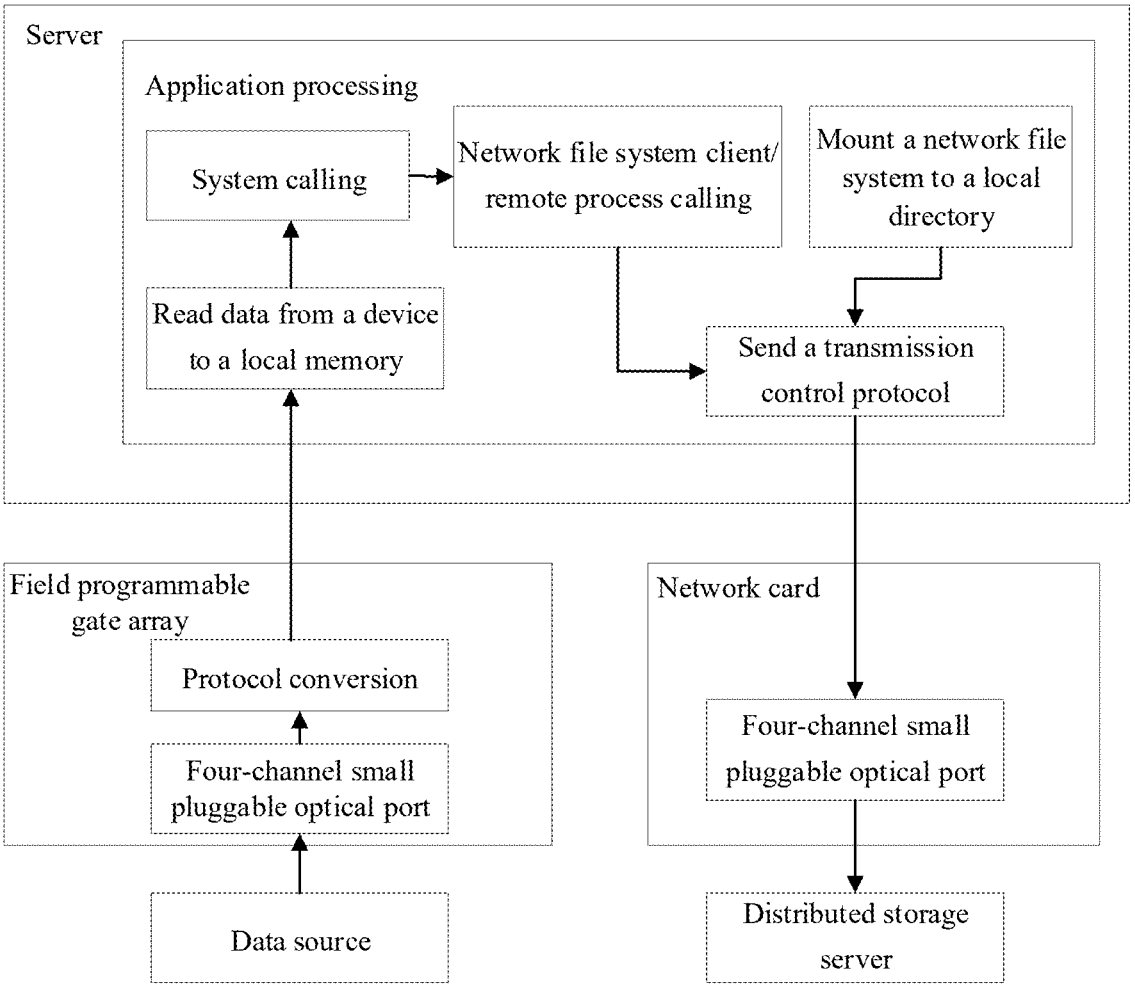
FIG. 1 is a flowchart of a data transfer solution in the related art.

At present, the usual practice is to transfer the data through a transfer device. The transfer device includes an FPGA device, a transfer server, and a network card (optical card), in which the FPGA device is configured for protocol parsing and data transmission; the transfer server is configured to mount an Internet Protocol (IP) address of a distributed storage server locally through an NFS of a system, and save received data to a mounted directory; and for the network card (optical card), the process of data storage by the transfer server is a process of storing files to the distributed storage server through a network port. For example, as shown in FIG. 1, FIG. 1 is a flowchart of a data transfer solution in the related art. However, this solution has the following disadvantages: an application program of the transfer server needs to read data to the server, and then the data is written to a mounted directory through file programming, accompanied by mass data replication, system protocol stack calling, and other processing. These processes often require a lot of time and CPU resources. Moreover, when the distributed storage server employs an NFS-v3 protocol that does not support multi-path, a set of transfer device may process only one data stream, which cannot effectively utilize the total bandwidth of the transfer server when pushing data to the distributed storage server. NFS multi-path (multi-channel): multiple IP addresses may be used to access a single NFS server. The distributed storage server usually provides multiple IPs to the outside, but for the NFS-v3 protocol that does not support multi-path, there is only one path between the transfer server and the storage server, which cannot effectively utilize the bandwidth of the transfer server. For an NFS-v4.1 protocol that supports multi-path, the transfer server may use multiple IPs to send data in parallel to the distributed storage server. The above factors lead to low efficiency in pushing data from the transfer device to the distributed storage server. Therefore, the present disclosure provides a data transfer solution, which avoids batch copying operations of data in a CPU, may improve data transfer efficiency, and reduces CPU resource consumption and hardware costs.

As shown in FIG. 2, an embodiment of the present disclosure discloses a method for transferring data, applied to a programmable logic device, including:

Step S11: storing to-be-transferred data to a self-mounted memory.

In specific implementation, the programmable logic device may be an FPGA, and the memory may be a DDR, namely, a Double Data Rate Synchronous Dynamic Random Access Memory (DDR SDRAM).

In the embodiment of the present disclosure, raw data may be parsed based on a target protocol corresponding to the raw data to obtain the to-be-transferred data; and the to-be-transferred data is stored to the self-mounted memory. Specifically, the target protocol corresponding to the raw data may be recognized; a preset protocol processing logic corresponding to the target protocol is filtered from a plurality of preset protocol processing logics; and the raw data is parsed based on the filtered preset protocol processing logic to obtain the to-be-transferred data. That is, in the embodiment of the present disclosure, processing logics of multiple protocols may be implemented in advance, and the obtained raw data is parsed based on the protocol corresponding to the raw data. In this way, the raw data is subjected to various private protocol parsing and real-time processing.

Step S12: uploading data information of the to-be-transferred data to a system on chip, so that the system on chip packages the data information through a network file system protocol to obtain a network file system protocol packet.

In an implementation, the data information of the to-be-transferred data may be packaged through a user datagram protocol to obtain a data information packet; and the data information packet is uploaded to the system on chip.

Moreover, in specific implementation, in the embodiment of the present disclosure, a data volume of the to-be-transferred data in the memory may be detected; and when the data volume reaches a preset threshold, the data information of the to-be-transferred data is uploaded to the system on chip. This prevents frequent uploading of data information when the data volume is small, thereby avoiding performance degradation.

In specific implementation, a storage address and a data length of the to-be-transferred data in the memory may be uploaded to the system on chip, so that the system on chip packages the data information based on the storage address and the data length through the network file system protocol to obtain the network file system protocol packet. That is, the data information may include the storage address and the data length of the to-be-transferred data in the memory. In addition, the system on chip returns the network file system protocol packet to the programmable logic device based on a Transmission Control Protocol (TCP).

In the embodiment of the present disclosure, an address used by the system on chip when packaging is an address in a pre-requested internal memory, and the data information is filled in from that address. The address length of the pre-requested internal memory is consistent with that of the memory. The address used by the system on chip when packaging is an address corresponding to the storage address. That is, the address used when packaging may have the same value as the storage address. The pre-requested internal memory may be a HugePages memory. An application program in the system on chip requests for the HugePages memory, the address length of which is consistent with the length of a DDR used in the FPGA. Memories requested by the application program correspond one to one with memories of the FPGA. The internal memory does not store actual service data, is only used for virtual processing of data to be compatible with a processing flow when sending, and does not require more complex processing at NFS and TCP levels.

In addition, the system on chip packages the data information in a user mode through the network file system protocol. In specific implementation, the system on chip packages the data information in the user mode over a plurality of threads for a plurality of storage servers in parallel through the network file system protocol. Each storage server may correspond to one thread. In this way, the packaging in the user mode through the network file system protocol avoids copying data from a kernel mode, further improving the data transfer efficiency. Moreover, the NFS implemented in the user mode is not affected by the fact that NFS-v3 does not support multi-path, greatly improving the utilization of transmission bandwidth.

Step S13: obtaining the network file system protocol packet returned by the system on chip, and adding the to-be-transferred data to the network file system protocol packet to obtain a target data packet.

In specific implementation, the network file system protocol packet may be parsed based on a TCP to obtain data information in the packet, corresponding to-be-transferred data is read from the self-mounted memory based on the data information, and the data information in the network file system protocol packet is replaced with the to-be-transferred data to obtain the target data packet.

Step S14: sending the target data packet to a corresponding storage server.

The target data packet is sent to the corresponding storage server through an optical port. The corresponding storage server is a destination server to which the target data packet is sent, namely, a distributed server in a distributed cluster, and the system on chip determines, based on a preset load balancing strategy, the destination server to which the target data packet is sent.

The embodiment of the present disclosure achieves NFS hardware offloading of high speed data, avoids batch copying operations of data in the CPU, improves CPU processing efficiency and the ability to push to the server. This does not require a CPU with strong processing power, but may be implemented by a low-end System on chip (SOC) through a heterogeneous platform FPGA+SOC instead of FPGA+server+network card, saving a lot of hardware costs.

Figure 3:
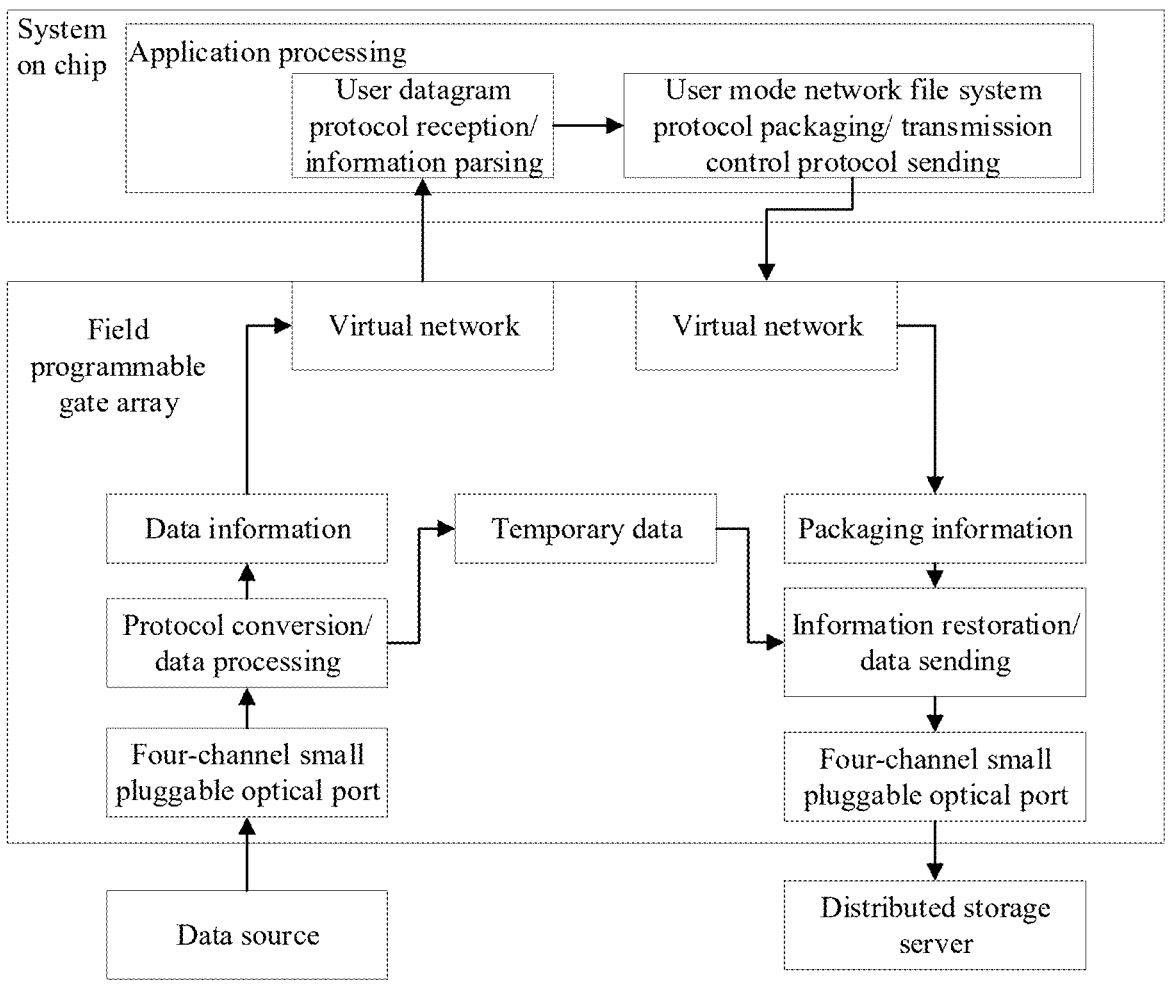
FIG. 3 is a schematic diagram of a specific data transfer solution according to an embodiment of the present disclosure.

For example, as shown in FIG. 3, FIG. 3 is a schematic diagram of a specific data transfer solution disclosed in an embodiment of the present disclosure. Specific steps include: raw data is parsed based on an original protocol by using the parallel and real-time processing characteristics of an FPGA, and to-be-transferred data is extracted based on the protocol and temporarily stored to a DDR mounted in the FPGA; the FPGA packages data information through a User Datagram Protocol (UDP) and uploads the packaged data information to an SOC, in which the data information includes a data length and an address of the DDR where high speed data (i.e., the to-be-transferred data), is located; and an application program requests HugePages memory, the address length of which is consistent with the length of the DDR used in the FPGA, in which memories requested by the application program correspond one to one with memories of the FPGA, and the requested memory does not store actual service data, is only used for virtual processing of data to be compatible with a processing flow when sending, and does not require more complex processing at NFS and TCP levels. The application program needs to implement UDP programming, NFS-client and SOCKET programs, which are respectively used for receiving data information, packaging virtual data, and sending data. After receiving data information of high speed data through the UDP, the application program parses the address and length information. An NFS is used for packaging, the direct address used for packaging is a corresponding address in the HugePages memory, and the corresponding data information is filled in from the direct address. The NFS sends the packaged data back to the FPGA through a TCP. After receiving the packaged data from the CPU, the FPGA parses and restores the packaged information according to an NFS protocol, to replace virtual data (namely, the data information) with the data temporarily stored in the FPGA; and the FPGA sends the replaced data to a distributed storage server through a Quad Small Form-factor Pluggable (QSFP) optical port.

Figure 4:
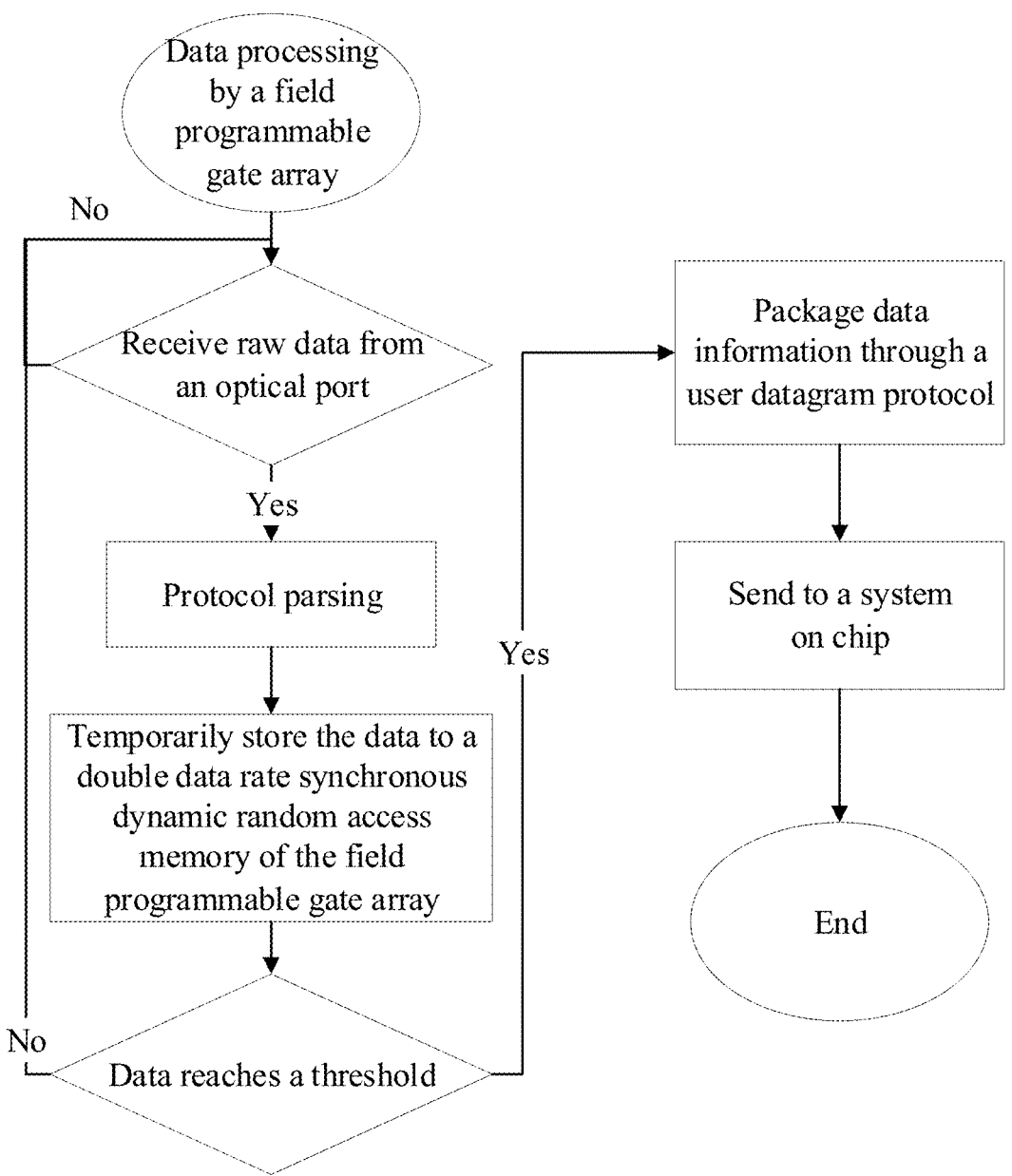
FIG. 4 is a specific flowchart of a process of uploading data information by an FPGA according to an embodiment of the present disclosure.

As shown in FIG. 4, FIG. 4 is a specific flowchart of a process of uploading data information by an FPGA according to an embodiment of the present disclosure. The FPGA receives raw data from the optical port and performs protocol processing on the raw data; the FPGA temporarily saves the processed data to the DDR of the FPGA; and when the saved data reaches a certain threshold, data information is generated, packaged through the UDP, and uploaded to the SOC.

Figure 5:
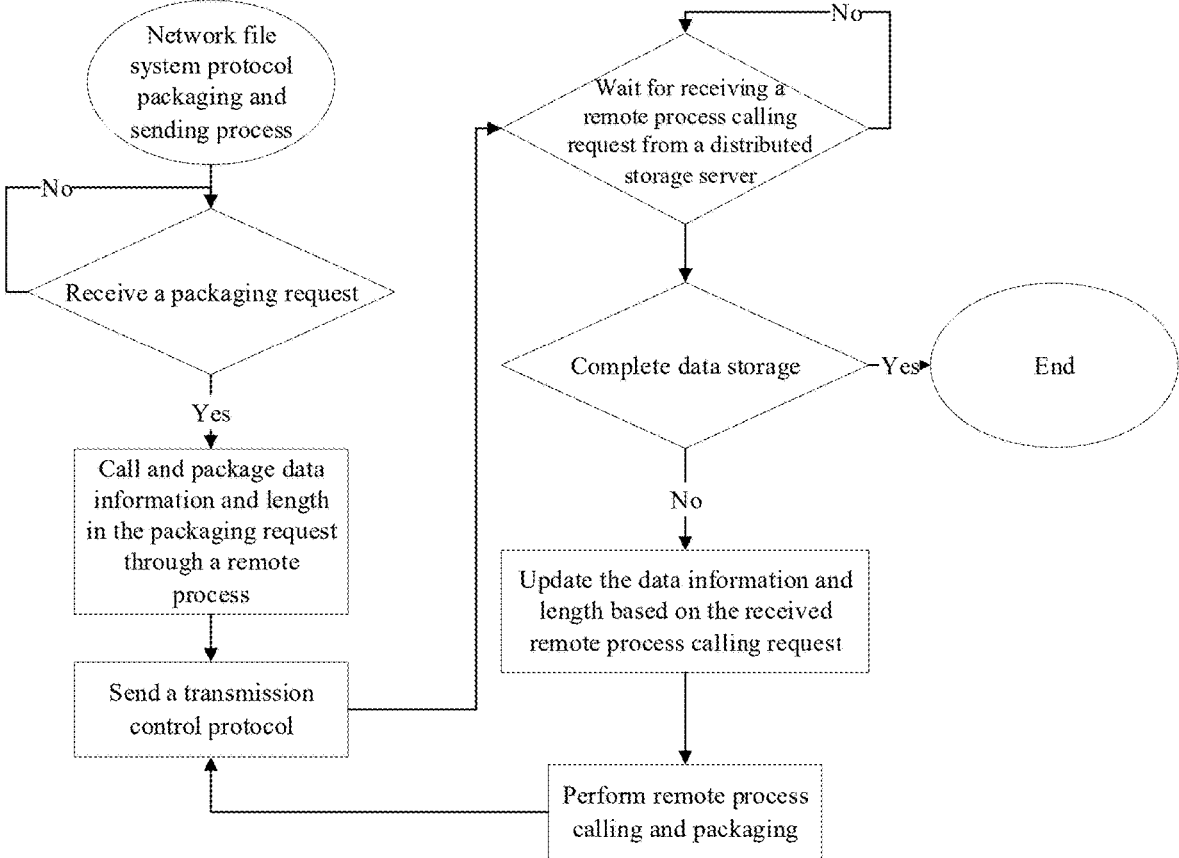
FIG. 5 is a flowchart of NFS packaging and sending by an application program according to an embodiment of the present disclosure.

Further, as shown in FIG. 5, FIG. 5 is a flowchart of NFS packaging and sending by an application program according to an embodiment of the present disclosure. The application program in the SOC requests a corresponding HugePages address in the FPGA, with the same size. After receiving the data information uploaded by the FPGA, the application program performs NFS packaging and sending in a user mode. The server sends a Remote Procedure Call (RPC) request, namely, a packaging request, to the SOC, and performs RPC packaging on the address and length in the packaging request, in which the address and length are sent by the SOC to the server. The main function of RPC is to designate a port corresponding to each NFS function and return it to a client, so that the client may be connected to the correct port.

Figure 6:
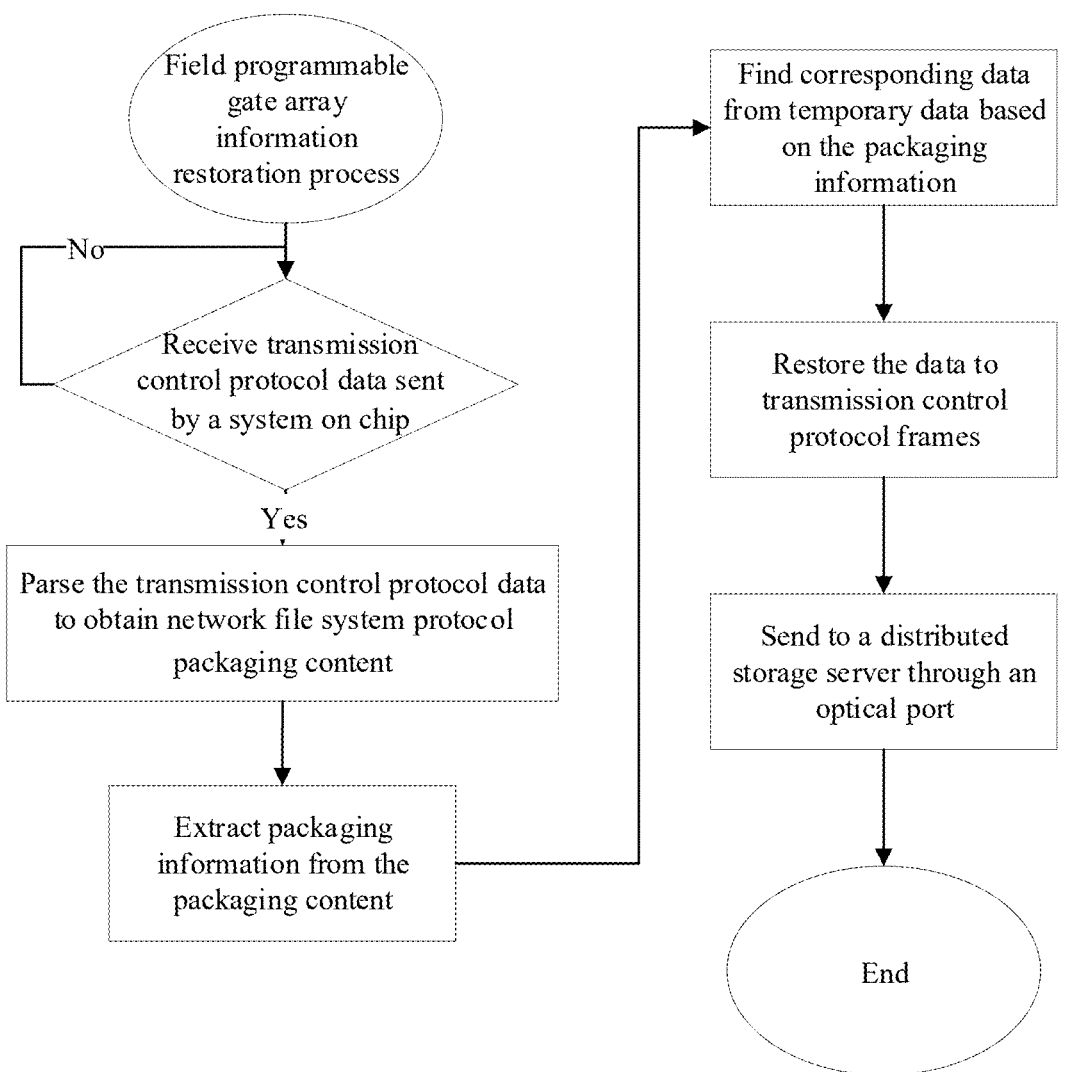
FIG. 6 is a flowchart of FPGA information restoration and sending according to an embodiment of the present disclosure.

Further, as shown in FIG. 6, FIG. 6 is a flowchart of FPGA information restoration and sending disclosed in an embodiment of the present disclosure. Upon receiving the packaged information sent by the application program, the FPGA restores the temporarily stored data; and the FPGA sends restored TCP frames to a distributed storage server through an optical port. Specifically, TCP data sent by an SOC is received, a TCP is parsed to obtain NFS packaging content, packaging information is extracted from the packaging content, corresponding data is found from temporary data based on the packaging information, and the data is restored to TCP frames and sent to the distributed storage server through the optical port.

It should be noted that, in terms of software flow, the FPGA implements a network port function for the SOC, and the application program run on the SOC may flexibly process data information through network programming and multi-threading; and the FPGA may perform various private protocol parsing and real-time processing on high speed data, and temporarily store the high speed data that requires NFS storage to FPGA, whereby only data information is uploaded. The application program implements virtual processing of the data information by requesting a HugePages memory corresponding to the FPGA; the application program may implement NFS protocol packaging in a user mode, flexibly process the packaged data information based on memory partitioning in the FPGA, and send the packaged information back to the FPGA for restoration through a network port in a TCP-SOCKET programming manner; and the FPGA may perform lightweight parsing of the NFS protocol, effectively extract packaging information, restore information, and send the information to the distributed storage server, whereby the NFS implemented in a user mode is not affected by the fact that the NFS-v3 of the system does not support multi-path, greatly improving the utilization of transmission bandwidth. In terms of hardware, a heterogeneous platform of FPGA+SOC is designed, based on the high-speed and real-time processing characteristics of the FPGA and SOC flexibility. In this way, zero copy of service data during NFS transfer is achieved through the collaboration of software and hardware, and the FPGA temporarily saves data after receiving the raw data and performing protocol processing; only data information is uploaded when an upload condition is satisfied; and upon receiving NFS packaged data, the packaged data is restored based on the packaged information and the temporarily saved data. In the SOC, the application program requests a memory address corresponding to the FPGA memory, and performs virtual packaging when receiving data information from the FPGA. Such processing is compatible with the original NFS communication flow, and does not require relevant modifications on the server or complex restoration processing by the FPGA. Under the collaboration of software and hardware, zero copy of high speed data is achieved. Inefficient push and high cost hardware during implementation by FPGA+server+network port are avoided.

That is, the embodiment of the present disclosure reduces transmission paths of data and achieves zero copy of transferred data through a heterogeneous platform. The data does not need to be analyzed by the application program. The application program works in data transfer to receive the overall data and perform NFS protocol packaging, in which the raw data is saved in the FPGA device; the application program virtually packages the data information and sends the packaged data back to the FPGA device; and the FPGA parses and restores the packaged information, fills the previously retained data into the sent data frames, and sends the data to the distributed storage server through the optical port.

As shown in FIG. 7, an embodiment of the present disclosure discloses a method for transferring data, applied to a system on chip, including:

Step S21: obtaining data information of to-be-transferred data uploaded by a programmable logic device, wherein the to-be-transferred data is stored to a memory mounted on the programmable logic device.

The data information may include a storage address and a data length of the to-be-transferred data in the memory. The programmable logic device may be an FPGA, and the memory may be a DDR.

Step S22: packaging the data information through a network file system protocol to obtain a network file system protocol packet;

In specific implementation, an internal memory may be requested, and the address length of the internal memory is consistent with that of the memory. The data information is packaged based on an address in the internal memory through the network file system protocol to obtain the network file system protocol packet. The pre-requested internal memory may be a HugePages memory. An application program in the system on chip requests the HugeP- ages memory, the address length of which is consistent with the length of the DDR used in the FPGA. Memories requested by the application program correspond one to one with memories of the FPGA. The internal memory does not store actual service data, is only used for virtual processing of data to be compatible with a processing flow when sending, and does not require more complex processing at NFS and TCP levels.

The data information is packaged in a user mode through the network file system protocol to obtain the network file system protocol packet. In specific implementation, the system on chip packages the data information in the user mode over a plurality of threads for a plurality of storage servers in parallel through the network file system protocol. Each storage server may correspond to one thread. In this way, the packaging in the user mode through the network file system protocol avoids copying data from a kernel mode, further improving the data transfer efficiency. Moreover, the NFS implemented in the user mode is not affected by the fact that NFS-v3 does not support multi-path, greatly improving the utilization of transmission bandwidth.

Step S23: returning the network file system protocol packet to the programmable logic device, so that the programmable logic device adds the to-be-transferred data to the network file system protocol packet to obtain a target data packet, and sends the target data packet to a corresponding storage server.

In specific implementation, the system on chip returns the network file system protocol packet to the programmable logic device based on a TCP. The programmable logic device sends the target data packet to the corresponding storage server through an optical port. The storage server is a distributed storage server.

In the embodiment of the present disclosure, the data information of the to-be-transferred data uploaded by the programmable logic device is obtained, in which the to-be-transferred data is stored in the memory mounted on the programmable logic device; then the data information is packaged through the network file system protocol to obtain the network file system protocol packet; and the network file system protocol packet is returned to the programmable logic device, so that the programmable logic device adds the to-be-transferred data to the network file system protocol packet to obtain the target data packet, and sends the target data packet to the corresponding storage server. That is, in the present disclosure, the to-be-transferred data is temporarily stored in the self-mounted memory, the data information of the to-be-transferred data instead of the data is uploaded to the system on chip, the system on chip packages the data information through the network file system protocol and returns the network file system protocol packet, and then the programmable logic device adds the to-be-transferred data to the network file system protocol packet and sends it to the storage server. This avoids batch copying operations of data in a CPU, may improve data transfer efficiency, and reduces CPU resource consumption and hardware costs.

As shown in FIG. 8, an embodiment of the present disclosure discloses an apparatus for transferring data, applied to a programmable logic device, including:

a temporary data storage module 11, configured to store to-be-transferred data to a self-mounted memory;

an information upload module 12, configured to upload data information of the to-be-transferred data to a system on chip, so that the system on chip packages the data information through a network file system protocol to obtain a network file system protocol packet;

a protocol packet obtaining module 13, configured to obtain the network file system protocol packet returned by the system on chip;

a data packet obtaining module 14, configured to add the to-be-transferred data to the network file system protocol packet to obtain a target data packet; and a data packet sending module 15, configured to send the target data packet to a corresponding storage server.

In the embodiment of the present disclosure, the to-be-transferred data is stored to the self-mounted memory; then the data information of the to-be-transferred data is uploaded to the system on chip, so that the system on chip packages the data information through the network file system protocol to obtain the network file system protocol packet; subsequently, the network file system protocol packet returned by the system on chip is obtained, and the to-be-transferred data is added to the network file system protocol packet to obtain the target data packet; and finally the target data packet is sent to the corresponding storage server. That is, in the embodiment of the present disclosure, the to-be-transferred data is temporarily stored in the self-mounted memory, the data information of the to-be-transferred data instead of the data is uploaded to the system on chip, the system on chip packages the data information through the network file system protocol and returns the network file system protocol packet, and then the programmable logic device adds the to-be-transferred data to the network file system protocol packet and sends it to the storage server. This avoids batch copying operations of data in a CPU, may improve data transfer efficiency, and reduces CPU resource consumption and hardware costs.

The data packet obtaining module 14 is specifically configured to replace the data information in the network file system protocol packet with the to-be-transferred data to obtain the target data packet.

The information upload module 12 specifically includes:

a data volume detection sub-module, configured to detect a data volume of the to-be-transferred data in the memory; and a data information upload sub-module, configured to upload the data information of the to-be-transferred data to the system on chip in response to that the data volume detection sub-module detects that the data volume reaches a preset threshold.

In specific implementation, the information upload module 12 is specifically configured to upload a storage address and a data length of the to-be-transferred data in the memory to the system on chip, so that the system on chip packages the data information based on the storage address and the data length through the network file system protocol to obtain the network file system protocol packet.

An address used by the system on chip when packaging is an address in a pre-requested internal memory, and the data information is filled in from that address. And the address length of the pre-requested internal memory is consistent with that of the memory. In addition, the address used by the system on chip when packaging is an address corresponding to the storage address.

Moreover, the system on chip packages the data information in a user mode through the network file system protocol. Further, in specific implementation, the system on chip packages the data information in the user mode over a plurality of threads for a plurality of storage servers in parallel through the network file system protocol.

In specific implementation, the temporary data storage module 11 specifically includes:

a data parsing sub-module, configured to parse raw data based on a target protocol corresponding to the raw data to obtain the to-be-transferred data; and a data storage sub-module, configured to store the to-be-transferred data to the self-mounted memory.

The data parsing sub-module specifically includes:

a protocol recognition unit, configured to recognize the target protocol corresponding to the raw data;

a processing logic filter unit, configured to filter a preset protocol processing logic corresponding to the target protocol from a plurality of preset protocol processing logics; and a data parsing unit, configured to parse the raw data based on the filtered preset protocol processing logic to obtain the to-be-transferred data.

The information upload module 12 specifically includes:

a data information packaging sub-module, configured to package the data information of the to-be-transferred data through a user datagram protocol to obtain a data information packet; and a data information packet upload sub-module, configured to upload the data information packet to the system on chip.

In specific implementation, the data packet sending module 15 is specifically configured to send the target data packet to the corresponding storage server through an optical port.

Further, an embodiment of the present disclosure discloses an apparatus for transferring data, applied to a system on chip, including:

a data information obtaining module, configured to obtain data information of to-be-transferred data uploaded by a programmable logic device, wherein the to-be-transferred data is stored to a memory mounted on the programmable logic device;

a data information packaging module, configured to package the data information through a network file system protocol to obtain a network file system protocol packet; and a protocol packet return module, configured to return the network file system protocol packet to the programmable logic device, so that the programmable logic device adds the to-be-transferred data to the network file system protocol packet to obtain a target data packet, and sends the target data packet to a corresponding storage server.

In the embodiment of the present disclosure, the data information of the to-be-transferred data uploaded by the programmable logic device is obtained, in which the to-be-transferred data is stored in the memory mounted on the programmable logic device; then the data information is packaged through the network file system protocol to obtain the network file system protocol packet; and the network file system protocol packet is returned to the programmable logic device, so that the programmable logic device adds the to-be-transferred data to the network file system protocol packet to obtain the target data packet, and sends the target data packet to the corresponding storage server. That is, in the present disclosure, the to-be-transferred data is temporarily stored in the self-mounted memory, the data information of the to-be-transferred data instead of the data is uploaded to the system on chip, the system on chip packages the data information through the network file system protocol and returns the network file system protocol packet, and then the programmable logic device adds the to-be-transferred data to the network file system protocol packet and sends it to the storage server. This avoids batch copying operations of data in a CPU, may improve data transfer efficiency, and reduces CPU resource consumption and hardware costs.

In specific implementation, the apparatus may further be configured to request an internal memory, wherein the address length of the internal memory is consistent with that of the memory.

Correspondingly, the data information packaging module is specifically configured to: package the data information based on an address in the internal memory through the network file system protocol to obtain the network file system protocol packet.

In addition, the data information packaging module is configured to package the data information in a user mode through the network file system protocol to obtain the network file system protocol packet. In a specific implementation, the data information packaging module is specifically configured to package the corresponding data information in the user mode over a plurality of threads for a plurality of storage servers in parallel through the network file system protocol.

Further, the present disclosure discloses a heterogeneous platform, including a programmable logic device and a system on chip, wherein the programmable logic device is configured to store to-be-transferred data to a self-mounted memory; upload data information of the to-be-transferred data to the system on chip, so that the system on chip packages the data information through a network file system protocol to obtain a network file system protocol packet; obtain the network file system protocol packet returned by the system on chip, and add the to-be-transferred data to the network file system protocol packet to obtain a target data packet; and send the target data packet to a corresponding storage server.

The system on chip is configured to obtain the data information of the to-be-transferred data uploaded by the programmable logic devices, in which the to-be-transferred data is stored in the memory mounted on the programmable logic device; package the data information through the network file system protocol to obtain the network file system protocol packet; and return the network file system protocol packet to the programmable logic device, so that the programmable logic device adds the to-be-transferred data to the network file system protocol packet to obtain the target data packet, and sends the target data packet to the corresponding storage server.

Figure 9:
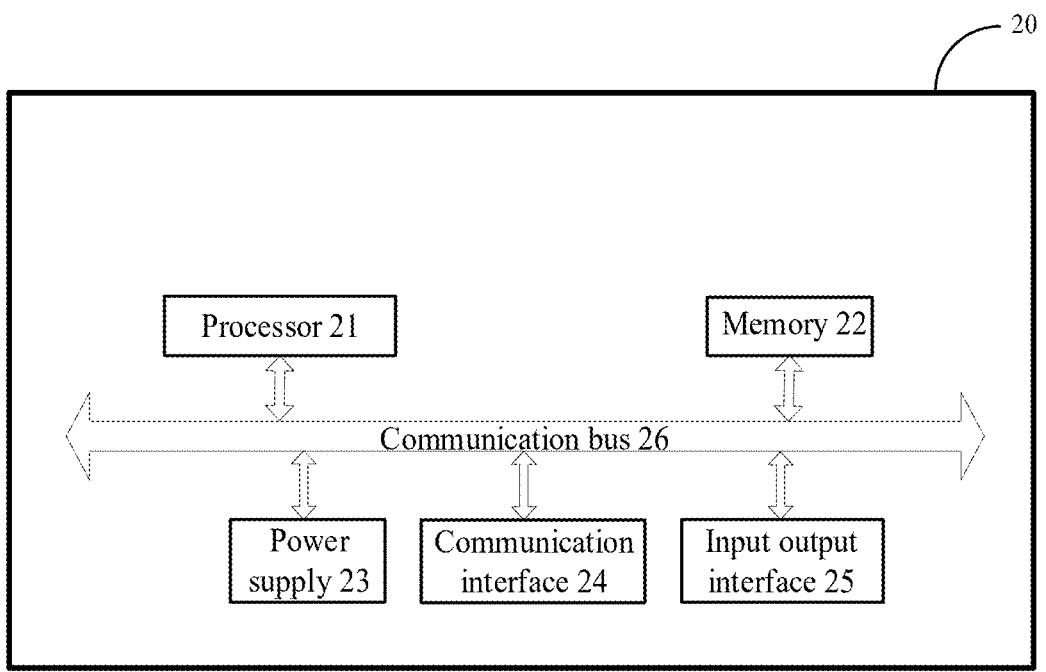
FIG. 9 is a structural diagram of an electronic device according to an embodiment of the present disclosure.

As shown in FIG. 9, an embodiment of the present disclosure discloses an electronic device 20, including a processor 21 and a memory 22, in which the memory 22 is configured to store a computer program; and the processor 21 is configured to execute the computer program to implement the method for transferring data disclosed in the foregoing embodiments.

The specific process of the above method for transferring data may refer to the corresponding content disclosed in the foregoing embodiments, and will not be repeated here.

In addition, as a carrier for resource storage, the memory 22 may be a read-only memory, a random access memory, a magnetic disk, an optical disk, or the like, and the storage may be short-term storage or permanent storage.

In addition, the electronic device 20 further includes a power supply 23, a communication interface 24, an input output interface 25, and a communication bus 26, in which the power supply 23 is configured to provide working voltage for various hardware devices in the electronic device 20; the communication interface 24 may create a data transmission channel between the electronic device 20 and an external device, following any communication protocol applicable to the technical solutions of the present disclosure, which is not specifically limited here; and the input output interface 25 is configured to obtain data input from the outside or output data to the outside, and its specific interface type may be selected according to specific application needs and is not specifically limited here.

Further, an embodiment of the present disclosure discloses a non-transitory computer-readable storage medium for storing a computer program that, when executed by a processor, implements the method for transferring data disclosed in the foregoing embodiments.

The specific process of the above method for transferring data may refer to the corresponding content disclosed in the foregoing embodiments, and will not be repeated here.

The embodiments in the description are described in a progressive manner, each embodiment focuses on differences from other embodiments, and reference may be made to the same or similar parts of the embodiments. The apparatus disclosed in embodiments corresponds to the method disclosed in embodiments and is thus described relatively simply, and reference may be made to the description of the method for related parts.

The steps of the methods or algorithms described in the embodiments disclosed herein may be directly implemented by hardware, software modules executed by a processor, or a combination thereof. The software modules may be placed in a Random Access Memory (RAM), an internal memory, a Read-Only Memory (ROM), an electrically programmable ROM, an electrically erasable programmable ROM, a register, a hard disk, a mobile disk, a CD-ROM, or any other form of storage medium known in the technical field.

The foregoing has provided a detailed introduction to method and apparatus for transferring data, heterogeneous platform, device, and medium provided by this disclosure. Specific examples are used herein to illustrate the principles and implementations of this disclosure. The descriptions of the above embodiments are merely intended to aid in understanding the method and core concepts of this disclosure. Meanwhile, for those of ordinary skill in the art, variations may occur in the specific implementations and scope of application based on the ideas of this disclosure. In summary, the content of this specification should not be construed as limiting this disclosure.

The invention claimed is:

1. A method for transferring data, applied to a programmable logic device, comprising:
   storing to-be-transferred data to a self-mounted memory;
   uploading data information of the to-be-transferred data to a system on chip, so that the system on chip packages the data information through a network file system protocol to obtain a network file system protocol packet;
   obtaining the network file system protocol packet returned by the system on chip, and adding the to-be-transferred data to the network file system protocol packet to obtain a target data packet; and
   sending the target data packet to a corresponding storage server.

2. The method for transferring data according to claim 1, wherein the adding the to-be-transferred data to the network file system protocol packet to obtain a target data packet comprises:
   replacing the data information in the network file system protocol packet with the to-be-transferred data to obtain the target data packet.

3. The method for transferring data according to claim 1, wherein the uploading data information of the to-be-transferred data to a system on chip comprises:
   detecting a data volume of the to-be-transferred data in the memory; and
   in response to that the data volume reaches a preset threshold, uploading the data information of the to-be-transferred data to the system on chip.

4. The method for transferring data according to claim 1, wherein the uploading data information of the to-be-transferred data to a system on chip comprises:
   uploading a storage address and a data length of the to-be-transferred data in the memory to the system on chip, so that the system on chip packages the data information based on the storage address and the data length through the network file system protocol to obtain the network file system protocol packet.

5. The method for transferring data according to claim 4, wherein an address used by the system on chip when packaging is an address in a pre-requested internal memory, and the data information is filled in from that address.

6. The method for transferring data according to claim 5, wherein the address length of the pre-requested internal memory is consistent with that of the memory.

7. The method for transferring data according to claim 6, wherein the address used by the system on chip when packaging is an address corresponding to the storage address.

8. The method for transferring data according to claim 1, wherein the system on chip packages the data information in a user mode through the network file system protocol.

9. The method for transferring data according to claim 1, wherein the system on chip packages the data information in a user mode over a plurality of threads for a plurality of storage servers in parallel through the network file system protocol.

10. The method for transferring data according to claim 1, wherein the storing to-be-transferred data to a self-mounted memory comprises:
   parsing raw data based on a target protocol corresponding to the raw data to obtain the to-be-transferred data; and
   storing the to-be-transferred data to the self-mounted memory.

11. The method for transferring data according to claim 10, wherein the parsing raw data based on a target protocol corresponding to the raw data to obtain the to-be-transferred data comprises:
   recognizing the target protocol corresponding to the raw data;
   filtering a preset protocol processing logic corresponding to the target protocol from a plurality of preset protocol processing logics; and
   parsing the raw data based on the filtered preset protocol processing logic to obtain the to-be-transferred data.

12. The method for transferring data according to claim 1, wherein the uploading data information of the to-be-transferred data to a system on chip comprises:
   packaging the data information of the to-be-transferred data through a user datagram protocol to obtain a data information packet; and uploading the data information packet to the system on chip.

13. The method for transferring data according to claim 1, wherein the sending the target data packet to a corresponding storage server comprises:

sending the target data packet to the corresponding storage server through an optical port.

14. An electronic device, comprising a memory and a processor, wherein the memory is configured to store a computer program; and the processor is configured to execute the computer program to implement the method for transferring data according to claim 1.

15. A non-transitory computer-readable storage medium for storing a computer program that, when executed by a processor, implements the method for transferring data according to claim 1.

16. A method for transferring data, applied to a system on chip, comprising:

obtaining data information of to-be-transferred data uploaded by a programmable logic device, wherein the to-be-transferred data is stored to a memory mounted on the programmable logic device;

packaging the data information through a network file system protocol to obtain a network file system protocol packet; and returning the network file system protocol packet to the programmable logic device, so that the programmable logic device adds the to-be-transferred data to the network file system protocol packet to obtain a target data packet, and sends the target data packet to a corresponding storage server.

17. The method for transferring data according to claim 16, further comprising:

requesting an internal memory, wherein the address length of the internal memory is consistent with that of the memory.

18. The method for transferring data according to claim 17, wherein the packaging the data information through a network file system protocol to obtain a network file system protocol packet comprises:

packaging the data information based on an address in the internal memory through the network file system protocol to obtain the network file system protocol packet.

19. The method for transferring data according to claim 16, wherein the packaging the data information through a network file system protocol to obtain a network file system protocol packet comprises:

packaging the data information in a user mode through the network file system protocol to obtain the network file system protocol packet.

20. A heterogeneous platform, comprising a programmable logic device and a system on chip, wherein the programmable logic device comprises a first memory and a first processor, and the system on chip comprises a second memory and a second processor; and the first memory is configured to perform the method for transferring data, the method comprises:

storing to-be-transferred data to a self-mounted memory;

uploading data information of the to-be-transferred data to a system on chip, so that the system on chip packages the data information through a network file system protocol to obtain a network file system protocol packet;

obtaining the network file system protocol packet returned by the system on chip, and adding the to-be-transferred data to the network file system protocol packet to obtain a target data packet; and sending the target data packet to a corresponding storage server;

and the second processor is configured to perform the method for transferring data, the method comprises:

obtaining data information of to-be-transferred data uploaded by a programmable logic device, wherein the to-be-transferred data is stored to a memory mounted on the programmable logic device;

packaging the data information through a network file system protocol to obtain a network file system protocol packet; and returning the network file system protocol packet to the programmable logic device, so that the programmable logic device adds the to-be-transferred data to the network file system protocol packet to obtain a target data packet, and sends the target data packet to a corresponding storage server.

\* \* \* \* \*